(12) United States Patent
Payen

(10) Patent No.: US 7,069,838 B2
(45) Date of Patent: Jul. 4, 2006

(54) CATALYTIC CONVERTER FOR FOOD COOKING APPLIANCES

(75) Inventor: Jean-Marc Payen, Quetigny (FR)

(73) Assignee: SEB S.A., Ecully (FR)

( * ) Notice: Subject to any disclaimer, the term of this patent is extended or adjusted under 35 U.S.C. 154(b) by 156 days.

(21) Appl. No.: 10/488,131

(22) PCT Filed: Aug. 30, 2002

(86) PCT No.: PCT/FR02/02967

§ 371 (c)(1),
(2), (4) Date: Aug. 24, 2004

(87) PCT Pub. No.: WO03/018190

PCT Pub. Date: Mar. 6, 2003

(65) Prior Publication Data

US 2005/0011369 A1   Jan. 20, 2005

(30) Foreign Application Priority Data

Aug. 31, 2001   (FR) .................................. 01 11470

(51) Int. Cl.
A47J 37/00 (2006.01)
A47J 37/12 (2006.01)
A47J 27/00 (2006.01)
A23L 1/00 (2006.01)

(52) U.S. Cl. ............... 99/330; 99/403; 126/389.1; 55/467.1; 55/DIG. 36; 422/171; 422/173; 422/174; 422/177

(58) Field of Classification Search ............... 99/330, 99/331, 403–410, 444–450, 483, 337, 411–418, 99/485, 470; 219/492, 494, 497, 452, 448, 219/506, 401; 126/299 E, 389.1, 299 D, 126/299 R; 55/DIG. 36, 446, 467, 385.1, 55/467.1; 312/385.4, 31.1; 422/170–174, 422/177, 180; 423/199, 210

See application file for complete search history.

(56) References Cited

U.S. PATENT DOCUMENTS

| 5,108,978 | A |   | 4/1992  | Durand et al. ............... 502/304 |
| 5,355,777 | A | * | 10/1994 | Chen et al. ................... 99/340 |
| 5,756,053 | A |   | 5/1998  | Hoke et al. .................. 422/174 |
| 5,839,357 | A | * | 11/1998 | Ha et al. ....................... 99/337 |
| 5,924,414 | A |   | 7/1999  | Schallig et al. ............. 126/391 |
| 6,283,015 | B1 | * | 9/2001 | Kwon et al. .................. 99/337 |
| 6,499,390 | B1 | * | 12/2002 | Huang .......................... 99/331 |
| 6,823,772 | B1 | * | 11/2004 | Payen et al. ................. 99/330 |

* cited by examiner

Primary Examiner—Timothy F. Simone

(74) Attorney, Agent, or Firm—James W. Kayden; Thomas, Kayden, Horstemeyer & Risley, LLP

(57) ABSTRACT

A catalytic converter designed to be integrated into a food-cooking appliance and to act, during a cooking cycle in a closed atmosphere and without oxygen being admitted from the outside, to treat the odors in the cooking fumes before the fumes are discharged to the outside, the converter comprising a basic substrate (30) provided with perforations (31) for passing the cooking fumes to be treated, the substrate (30) being coated with an intermediate layer (32) having a large surface area, itself provided with a surface component (33) formed of an inorganic solution based on precious metals so as to form the catalytic active layer of the converter, the intermediate layer (32) comprising alumina and cerine so as to form an intermediate layer (32) with a surface area of not less than 150 square meters per gram ($m^2/g$), the amount of alumina/cerine added to the basic substrate (30) lying in the range 30 $g/m^2$ to 35 $g/m^2$, including 15 $g/m^2$ of cerine to 25 $g/m^2$ of cerine. The catalytic converters, in particular, for a deep fryer.

9 Claims, 2 Drawing Sheets

CATALYTIC CONVERTER FOR FOOD COOKING APPLIANCES

TECHNICAL FIELD

The present disclosure relates to the general field of catalytic converters making it possible to treat malodorous fluids in order to render them odorless, the present invention relating more particularly to catalytic converters serving to treat cooking odors, in particular frying odors, resulting from cooking food in a household electric appliance for cooking food.

The present disclosure relates to a catalytic converter designed to be integrated into a food-cooking appliance of the deep fryer type, for acting during a cycle of cooking in a closed atmosphere and without oxygen being admitted from the outside, to treat the odors from the cooking fumes before said fumes are discharged to the outside.

BACKGROUND

In food-cooking appliances, in particular deep flyers, it is known that when the food to be cooked is immersed in the oil or fat which is heated to a high temperature, chemical substances are released into the air, such substances having a strong, unpleasant, and distinctive odor characteristic of the flying operation proper. The chemical substances released into the air and responsible for the unpleasant odor are known and are mainly constituted by volatile organic compounds (VOCs), aldehydes, and acids.

Naturally, it is already known that various treatment means can be used for the purpose of preventing or treating the fumes that result from cooking food in such cooking appliances.

A first one of such known treatment means consists, naturally, in cooking the food in a closed atmosphere by implementing a suitably leaktight connection between the bowl and the lid of the appliance.

However, for obvious safety reasons, in particular in deep fryers in which, it is necessary to provide an exhaust outlet for the cooking fumes because of the large quantity of fumes generated by the food during frying (especially when potatoes are being fried), such appliances are equipped with means for treating cooking odors in order to rid the cooking fumes of all or some of the volatile molecules responsible for the cooking odor.

Various devices have been devised, and in particular it is known that activated carbon filters can be used that make it possible to retain all or some of the grease, as is described, for example, in Patent FR-1 568 985 or in Patent EP-150 516.

Unfortunately, in order to be effective, activated carbon filters in the cooking appliance must be changed frequently, which constitutes an additional design constraint for the appliance insofar as it is essential to make provision to design a system for fitting and removing the activated carbon filter. In addition, it is observed that the user frequently forgets to change the activated carbon filter, such an operation being perceived as a chore. The combination of all of those reasons makes the use of activated carbon filters ill-suited for treating cooking odors. In addition, they are not absolutely and universally effective and they also allow the stream of treated fumes discharged from the appliance to be seen.

A system for treating frying odors is also known that consists in condensing the cooking fumes in a condensation system mounted in the appliance. Such a system does not suffer from the drawbacks of having to change all or some of the system as is required for activated carbon filters, but it does require the user to perform a relatively tedious action each time a cooking operation is effected. The condensation system must be kept at a very low temperature, e.g. in a freezer, throughout the periods during which it is not in use, and it must then be fitted to the cooking appliance itself before any cooking operation. In addition, that system must then be emptied after the cooking operation. The requirement to make the system cold again prevents another cooking operation from being performed with the same system for 24 hours. This systematic fitting operation can be perceived by the user as an additional chore. Furthermore, condensation systems are generally large in volume, which constitutes a further design constraint insofar as it is necessary to integrate such a system into a cooking appliance whose size must generally be limited.

Finally it is already known that a catalytic converter can be used that is mounted in the lid of a deep fryer for the purpose of treating cooking odors. The use of catalytic converters avoids any specific action being necessary, unlike systems including activated carbon filters or condensation systems, because the catalytic converter is installed permanently in the appliance, and thus forms a permanent odor treatment unit.

Unfortunately, a catalytic converter that is to be integrated into a food-cooking appliance, and in particular into a deep fryer, is difficult to design, and known catalytic converters that are used in deep fryers are unsatisfactory, and indeed such use remains the exception.

Designing a catalytic converter that is to be integrated into a food-cooking appliance is made particularly difficult because of the need to keep the cooking appliance completely closed throughout a cooking cycle, which implies that no oxygen is admitted from the outside during one full cooking cycle, the cooking thus taking place in an atmosphere that is substantially closed, ignoring leaks.

That constraint implies firstly that all of the cooking fumes pass through the catalytic converter, and secondly that the catalytic converter is capable of reacting appropriately throughout the entire cooking cycle without any oxygen being admitted from the outside, and merely by making good use of the initial volume of fluid contained inside the cooking enclosure.

In addition, for greater effectiveness, the catalytic converter must be defined such that the fumes generated by the cooking can pass freely through the converter, without them passing therethrough at excessive speeds, precisely so as to ensure that the fumes are treated properly in the active portion of the catalytic converter proper.

Finally, it will be understood that catalytic converters designed for use in the household electrical field must satisfy conventional criteria of being reliable, low in cost, and long-lasting.

SUMMARY

An object of the present disclosure is therefore to remedy the various above-mentioned drawbacks of the prior art and to satisfy the above-mentioned needs, and to provide a novel catalytic converter designed to be integrated into a food-cooking appliance, for acting, without oxygen being admitted from the outside, to treat the cooking odors before they are discharged to the outside, said converter offering good effectiveness while also being of size adapted to its use, and being low in cost.

Another object of the disclosure is to provide a novel catalytic converter that offers high efficiency and that makes it possible to guarantee good contact between the fumes to be treated and the active portions of the converter.

Another object of the disclosure is to provide a novel catalytic converter that is effective throughout a considerable life span, in particular for a domestic deep fryer.

The objects desired are achieved by means of a catalytic converter designed to be integrated into a food-cooking appliance and to act, during a cooking cycle in a closed atmosphere and without oxygen being admitted from the outside, to treat the odors in the cooking fumes before the fumes are discharged to the outside, the converter including a basic substrate provided with perforations for passing the cooking fumes to be treated, the substrate being coated with an intermediate layer having a large surface area, itself provided with a surface component formed of an inorganic solution based on precious metals so as to form the catalytic active layer of the converter, the catalytic converter having an intermediate layer including alumina and cerine so as to form an intermediate layer with a surface area of not less than 150 square meters per gram ($m^2/g$), the amount of alumina/cerine added to the basic substrate lying in the range 30 $g/m^2$ to 35 $g/m^2$, including 15 $g/m^2$ to 20 $g/m^2$ of cerine.

BRIEF DESCRIPTION OF THE DRAWINGS

Other objects and advantages of the present invention will appear in more detail on reading the following description with reference to the accompanying drawings which are given by way of non-limiting and illustrative example, and in which.

DETAILED DESCRIPTION

In the embodiments shown in FIGS. 1 to 5, the food-cooking appliance that is described is constituted by a deep fryer serving for and designed for deep frying all kinds of food in fat, such as a bath of oil, for example. For the purposes of the disclosure, the term "food-cooking appliance" should nevertheless be extended to cover all domestic food-cooking appliances that are suitable for cooking food, application to frying appliances of the deep fryer type being merely a preferred application, it naturally being possible for application to other uses such as to rice cookers or to multi-purpose cookers, provided that such cooking appliances implement cooking in a cooking fluid contained in a closed enclosure that is substantially leaktight.

Figure 1:
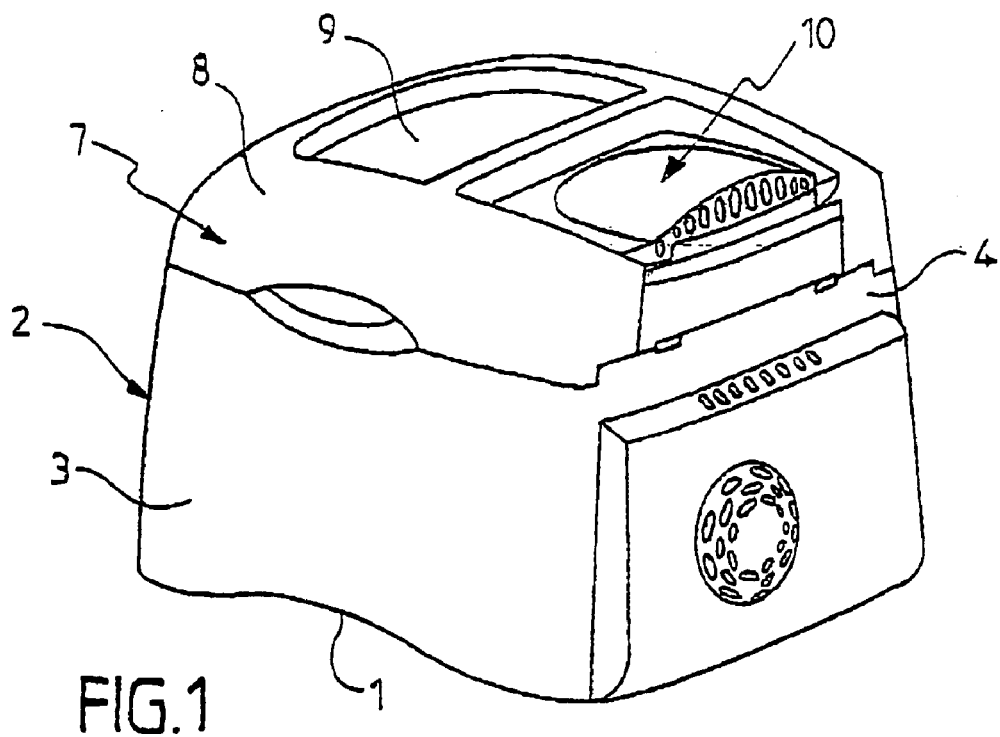
FIG. 1 is an overall perspective view of a food-cooking appliance of the invention (a deep fryer in this example), incorporating a catalytic converter of the disclosure.
Figure 2:
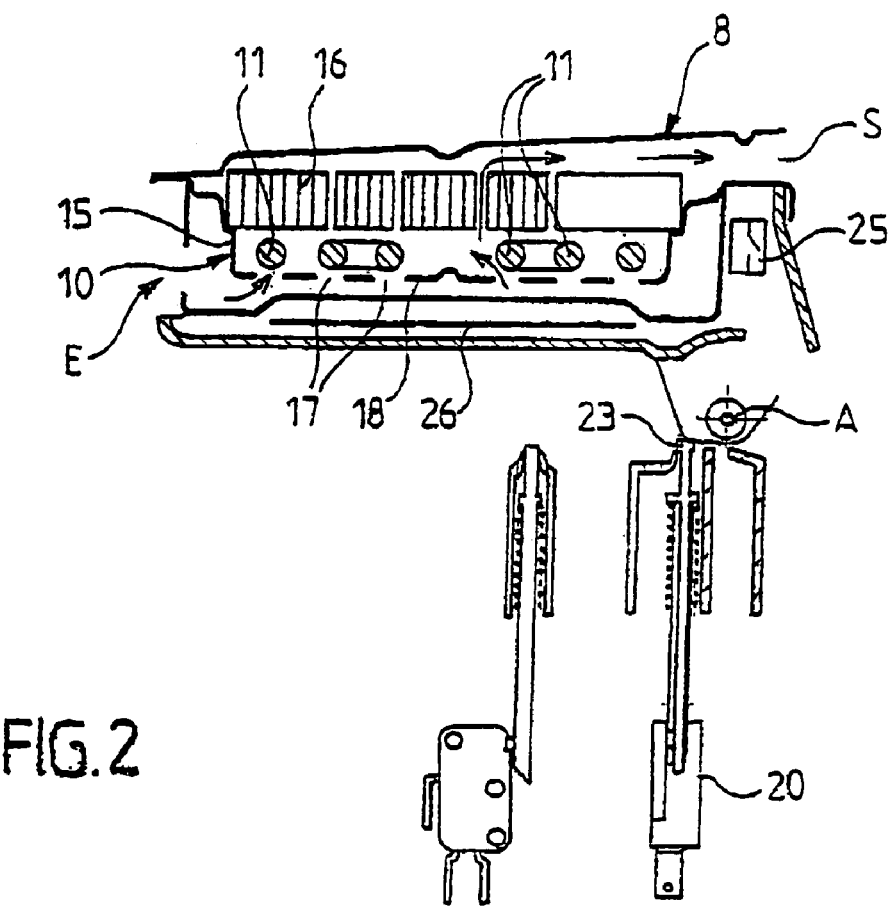
FIG. 2 is a fragmentary cross-section view, showing an embodiment of a catalytic converter of the disclosure.

The food-cooking appliance shown in FIGS. 1 and 2, which is an electric deep fryer in this example, includes a base 1 serving to form the stand for the appliance and designed to rest on a support surface or worktop. The base 1 is generally integral with an outer skirt 2 or else it is separate and secured thereto, the skirt being made, for example, of a metal or of a heat-resistant plastic forming the outer casing of the deep fryer. However, the outer skirt 2 is conventionally made of a plastic that is cheap and not very heat-resistant such as polypropylene, and that cannot withstand the heat energy dissipated continuously by the high-temperature heater elements conventionally used in electric deep fryers, and generally disposed at the bottom in the vicinity of the base 1.

The heater means of the appliance (not shown in the figures) may be internal to the appliance and conventionally composed of metal-clad elements or equivalent elements, connected, also conventionally, to an electrical connection unit (not shown) and to electrical cabling making it possible to connect the appliance to the mains. Also in a manner known to the person skilled in the art, the cooking appliance of the disclosure is provided with a set of electrical or electronic safety means such as temperature sensors, fuses, etc. required when designing such appliances. Since these elements are well known to the person skilled in the art, they are not described in any more detail in the remainder of the description. The heater means may also be external to the appliance and separate or separable therefrom.

In the preferred embodiment, the deep fryer has a removably mounted lid 7 hinged relative to the main body of the deep fryer and serving, during the cooking, to close the main body in substantially leaktight manner, e.g. by means of sealing gaskets (not shown in the figures).

Advantageously, and as shown in FIGS. 1 and 2 in particular, the lid 7 may be provided on its top face 8 with an inspection window 9 making it possible to monitor the progress of the cooking or of the frying throughout the cooking cycle, and while the lid is closed on the main body.

Cooking food in a closed environment in a cooking fluid, be it by steaming or by frying, generates characteristic and often unpleasant odors resulting from chemical reactions related to the cooking proper, and in particular to the emission of volatile organic compounds.

The appliance for cooking food in a closed atmosphere thus includes a bowl (not shown), a lid 8, and heater means that are internal or external and that serve to perform the cooking. It further includes a system for applying heat treatment to the cooking odors, namely a catalytic subassembly 10 for treating the odors from the fumes before they are discharged to the outside of the appliance.

Preferably, and as illustrated, for example, in FIG. 2, the catalytic subassembly 10 includes at least one heater element 11, the appliance further including regulation means for regulating the temperature of the heater elements 11, the regulation means being organized to sense the temperature of the cooking zone.

By means of this configuration, it is thus possible to regulate the temperature of the heater elements 11 of the catalytic converter 10 via a thermal image that is not situated in the catalytic converter itself but rather that corresponds to an image representative of the temperature prevailing in the cooking fluid.

In a particularly advantageous version, the catalytic subassembly 10 is formed by a housing 15 which is mounted and integrated in the lid 8 of the appliance.

The housing 15 contains a catalytic unit or catalytic converter 16 forming the top portion of the housing 15, and extending in the vicinity of the outside face of the cover 8. The housing 15 also contains the heater elements 11 which extend in the vicinity of and under the catalytic converter 16 for the purpose of heating it by radiation, without hot spots appearing. The housing 15 is provided with admission orifices 17 for admitting the cooking fumes to be treated, the orifices 17 being, for example, provided through a stainless steel bottom plate 18 of said housing 15 that is situated substantially in register with the cooking bowl, the heater elements 11 being interposed between the orifices 17 and the catalytic unit 16, and being disposed substantially in register with the orifices 17.

By means of this configuration, the cooking fumes to be treated are heated in uniform manner, thereby guaranteeing that the catalytic converter operates properly and with good effectiveness.

Advantageously, the heater elements 11 are formed by a resistor in the form of a sinuous or helical coil, for example.

Advantageously, and in order to obtain excellent effectiveness in treating the odors, the heater elements 11 have a maximum heat load of not more than 3 watts per square centimeter (W/cm$^2$), and preferably less than or equal to 2.5 W/cm$^2$. This makes it possible to obtain a maximum temperature of about 600° C. during treatment, which avoids overheating and which makes it possible to maintain uniformity in treating the fumes.

According to an advantageous feature, the heater elements 11 are connected to an electrical circuit including a switch 20, such as a micro-switch associated with the position of the lid 8, so that the switch 20 interrupts the electrical power supply to the heater elements 11 as soon as the lid is opened or removed.

The operating safety of the appliance may be increased by fitting an ambient temperature safety thermostat 25 in the appliance, in the vicinity of the catalytic converter 10.

Advantageously, a backing plate 26 may be integrated under the housing 15 and at some distance therefrom for providing a thermal brake and for protecting the plastics structure of the lid 8 in the event of temporary overheating.

Conventionally, the catalytic unit 16 may be made of a material of the cordierite, ceramic, or zirconia-mullite type, with standard calibrated holes of 100 cells per square inch (CPSI) or 400 CPSI (15.52 cells per square centimeter (CPSC) or 62.09 CPSC) or it may be made of a material of the 20 pounds per inch (PPI) foam type in supports, such as those sold by SICAT, for example. It is also possible to consider using silicon carbide foams.

The surface area of the catalytic unit 16 is computed so as to avoid head loss and so as to obtain an acceptable transit speed for the fumes. By way of example, the basic surface area of the catalytic unit 16 may be 4000 square millimeters (mm$^2$) for a height of at least about 30 millimeters (mm), with calibrated holes of 200 CPSI or 400 CPSI (15.52 CPSC or 62.09 CPSC). In another variant embodiment, the catalytic unit may have a basic surface area of about 8000 mm$^2$ with a reduced height of 12 mm for calibrated holes of 200 CPSI or 400 CPSI (15.52 CPSC or 62.09 CPSC).

During cooking, the cooking fumes are directed towards the inlet E of the catalytic converter 10 so as to penetrate into the orifices 17 after being distributed along an inlet channel situated under and along the admission orifices 17.

The cooking fumes are then preheated or heated by flowing over the heater elements 11, they are then treated by catalysis by flowing through the catalytic unit or catalytic converter 16, and they are then discharged to the outside of the deep fryer, preferably backwards via the outlet S.

In addition to the odors being treated as they flow through the hot portions of the catalytic converter, the oil vapors contained in the fumes undergo pyrolysis which guarantees that the cooking fumes at the outlet of the catalytic converter are treated in full.

Thus, the catalytic converter 16 is designed to be integrated into a food-cooking appliance which, in this example, is preferably a deep fryer, the catalytic converter acting during a cooking cycle in a closed atmosphere and without oxygen being admitted from the outside, to treat the odors from the cooking fumes before said fumes are discharged to the outside. The catalytic converter 16 used operates in known manner on the basis of catalytic reactions involving full oxidation reactions, making it possible for the oxygen from the air to react with the malodorous substances on the active surface of the converter, so as to obtain transformed elementary substances that are odorless.

The general principle of catalysis is thus to maintain the catalytic converter at a very high temperature, so that the cooking fumes, which, in this example, are the frying fumes from a deep fryer, react on the catalytic converter to transform into carbon dioxide and water vapor.

Preferably, the catalytic converter 16 (FIG. 5) includes a basic substrate 30 provided with perforations 31 for passing the cooking fumes to be treated before they are discharged to the outside of the appliance, the substrate 30 being coated with an intermediate layer 32 having a large surface area which is itself provided with a surface component 33 and thus constitutes the heat exchange surface area of the catalytic converter, the component being formed of an inorganic solution based on precious metals for forming the catalytic outer active layer of the converter 16. Preferably, the intermediate layer 32 includes alumina (aluminum) and cerine (cerium) so as to form an intermediate layer 32 whose surface area is not less than 150 m$^2$/g. The cerine serves to mitigate the lack of oxygen during the cooking cycle, and thus makes it possible to obtain a permanent catalytic reaction, while the minimum surface area (150 m$^2$/g) of the intermediate layer makes it possible to maximize the dispersion of the cooking fumes through the converter, and to optimize the effectiveness of the treatment, while obtaining a long life span for the converter.

In view of the particular domestic use in question, implying that the appliance is used intermittently and has a working life time of about 200 hours, the concentration of alumina/cerine added is considerable compared with conventional uses of catalytic converters, e.g. in exhaust pipes. Thus, for a deep fryer, the cerine/alumina ratio is in the range 1 to 1.50, and preferably about 1.33, the upper limit being the appearance of a sticky intermediate layer structure that might clog the pores and therefore reduce the effectiveness of treatment.

In order to obtain a further improvement in the effectiveness of the catalytic converter of the invention, it has been observed that the surface area of the basic substrate 30 should also satisfy a minimum surface area constraint.

Thus, it has been observed that good odor treatment results can also be obtained when the basic substrate 30 has at least a minimum surface area of 0.0034 square meters per liter (m$^2$/l) of water vapor treated per minute.

By way of example, for a deep fryer that is to process a quantity of potatoes lying approximately in the range 1 kilogram (kg) to 1.25 kg with heater power of 2000 W, these minimum parameters for the catalytic converter 16 correspond to the following criteria:

mean quantity of fumes passing through the catalytic converter: 600 g;
molecular weight of water: 18 grams per mole (g/mol);
normal temperature condition: 273 Kelvins (K);
perfect gas constancy: 0.0821;
volume of fumes to be treated: 747.11 liters (l);
cooking time (cooking cycle): 13 minutes;

quantity of fumes passing through the catalytic converter: 57.5 liters per minute (l/min.).

For a non-treated unit having a diameter 102 mm and a height of 12.5 mm, and provided with 196 perforations per square inch (PSI) (30.42 perforations per square centimeter (PSC)), with a wall thickness of 0.24 mm, the surface area of the basic substrate computed over 2500 perforations in total is about 0.196 $m^2$ (i.e. approximately 0.2 $m^2$).

A catalytic converter dimensioned in this way has been shown to give preferable results.

In preferred embodiments, results may be obtained when the basic substrate 30 is provided with in the range 190 perforations 31 per square inch (PSI) (29.49 perforations per square centimeter (PSC)) to 400 PSI (62.09 PSC), and preferably about 200 PSI (31.04 PSC).

The substrate 30 is a monolithic material having a honeycomb structure, made of alumina or of cordierite, and having a very low coefficient of thermal expansion and very high resistance to high temperatures and to thermal shocks.

The perforations 31 may be of any appropriate shape and of any appropriate cross-sectional area, and, for, example may be circular or hexagonal, and they are obtained using techniques that are well-known to the person skilled in the art, involving mixing of selected earths, while conserving a specific degree of humidity, and then performing a series of cooking and evaporation cycles.

Because of its relatively low cost, cordierite is the preferred material for the substrate.

The intermediate layer 32 (washcoat), which acts as a medium for the active phase of the catalytic converter, is an inorganic solution which is deposited, by soaking or spraying (by means of a spray gun) with alumina, onto the basic substrate 30. Cerine may be incorporated during the operation of soaking or spraying with alumina, so as to obtain a distribution of the cerine in the intermediate layer that is as uniform as possible.

As is well known to the person skilled in the art, various types of alumina may naturally be used. In the embodiment given above, coating with the intermediate layer 32 corresponds to a minimum addition of 7 g of alumina/cerine, the surface area of the basic substrate 30 corresponding to about 0.2 $m^2$ (35 g/$m^2$), including 4 g of cerine, i.e. 20 g/$m^2$ of cerine.

Preferably, the amount of alumina/cerine added is thus about 35 g/$m^2$ of surface area of the basic substrate 30. It is also possible to reduce significantly the amount of alumina and of cerine to 3 g each to achieve amounts of about 30 g/$m^2$ of alumina/cerine, i.e. 15 g/$m^2$ of cerine, while maintaining good treatment effectiveness, in particular in a domestic deep fryer operating with a closed lid. In all, various embodiments thus involve an amount of alumina/cerine added to the surface of the of the basic substrate that lies approximately in the range 30 g/$m^2$ to 35 g/$m^2$, including 15 g/$m^2$ to 20 g/$m^2$ of cerine.

The surface component 33 is an inorganic solution containing a precious metal or a mixture of precious metals or else a mixture of oxides of one or more of the precious metals chosen in particular from platinum, copper, manganese, palladium, etc. Advantageously, and for reasons of cost, the preferred precious metal for the purposes of the preferred embodiment is platinum, having a vapor pressure that is low enough to avoid loss of active substance while in operation. In addition, the metal chosen must prevent reactions forming chemical substances from being initiated between the surface component, which forms the active portion of the catalytic converter, and the intermediate layer 32.

The chosen metal (preferably platinum) may be deposited while the intermediate layer 32 is being deposited, or at some subsequent stage, which is preferable for economic reasons since it makes it possible to disperse smaller quantities of platinum.

The chosen metal (preferably platinum) is dispersed in the intermediate layer 32 and at its surface, at a concentration of at least 0.02380 milligrams per square meter (mg/$m^2$) and at the most 0.06666 mg/$m^2$, which corresponds respectively to values lying in the range 25 mg to 70 mg of platinum added to the minimum surface area of the intermediate layer 32. In view of the large proportion of cerine in the intermediate layer 32, good treatment effectiveness necessarily requires the platinum to be at the surface of the intermediate layer 32.

Figure 3:
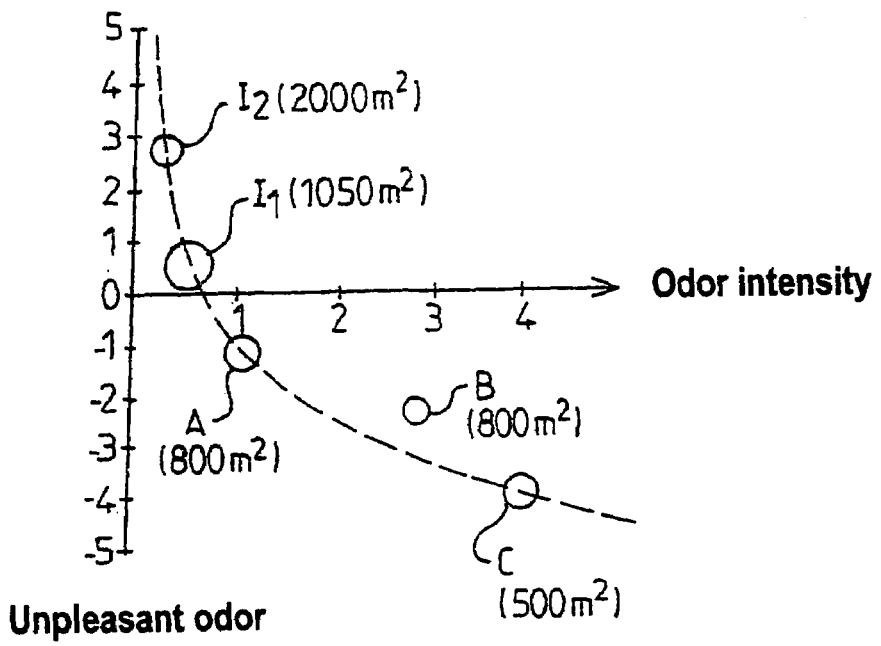
FIG. 3 is a comparative graph resulting from practical tests and illustrating the effectiveness of the catalytic converter of the disclosure.
Figure 4:
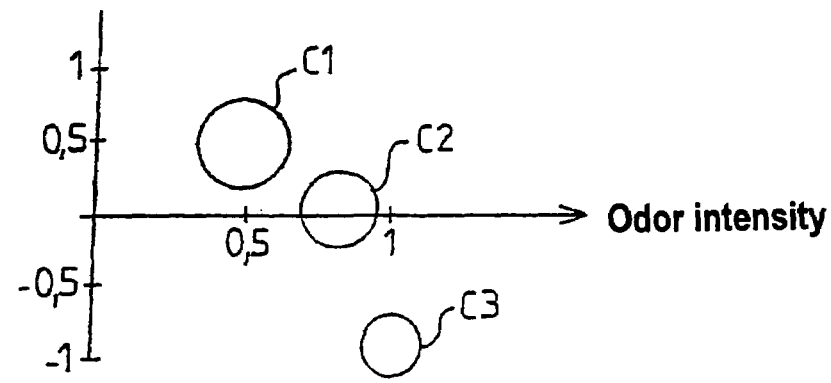
FIG. 4 is a comparative graph resulting from practical tests and illustrating the influence of the platinum deposit on the effectiveness of a catalytic converter of the disclosure.
Figure 5:
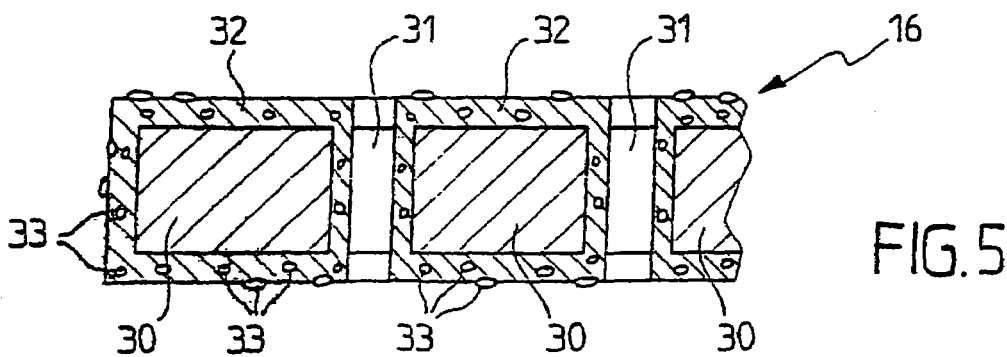
FIG. 5 is a diagrammatic cross-section view of an embodiment of a catalytic converter of the disclosure.

The practical tests performed, the results of which are given in FIGS. 3 and 4, correspond to olfactory determination of the odors discharged into the atmosphere by a deep fryer provided with a catalytic converter having variable characteristics. Olfactory determination was performed by submitting the odors to a jury for scoring, the jury comprising at least a minimum of nine people, and by comparing the results obtained with the results of olfactometric analyses performed by means of a dilution olfactometer, it being necessary for the measurements chosen to be correlated with at least the scores of one half of the jury.

The results obtained are presented as a plot of odor pleasantness to unpleasantness as a function of perceived odor intensity.

The results given in FIG. 3 show the incidence of the value of the surface area of the intermediate layer 32. Thus, the results shown in FIGS. 3 and 4 correspond to a standard deep fryer as defined above, and they therefore correspond to heating power of about 2000 W, and to a food-processing capacity of about 1 kg to 1.25 kg of potato fries. The graphs show that the deep fryers provided with respective catalytic converters $I_1$ and $I_2$ corresponding to respective surface areas for the intermediate layer 32 of 1050 $m^2$ (200 PSI) (31.04 PSC) and of 2000 $m^2$ (200 PSI) (31.04 PSC) are the only deep fryers that discharged cooking fumes of odor that was pleasant and of low intensity, indicating that treatment was effective.

It should also be noted that the catalytic converters that have the highest intermediate layer surface areas are the converters that show the highest effectiveness. The even higher results corresponding to the top portion of the dashed curve of FIG. 3 correspond to catalytic converters whose number of perforations 31 per unit area is higher, i.e. about 400 PSI.

The deep fryers equipped with catalytic converters A, B, and C, where:

A: surface area for the intermediate layer 32 of 800 $m^2$ with calibration for the perforations 31 of greater than 200 PSI (31.04 PSC);

B: surface area for the intermediate layer 32 of about 800 $m^2$ with calibration for the perforations 31 of about 100 PSI (15.52 PSC); and C: surface area for the intermediate layer 32 of about 500 $m^2$ obtained with foams or with metal meshes;

do not make it possible to treat frying odors effectively since an unpleasant odor is perceived continuously, with the intensity of the odor increasing with decreasing treatment area, in particular when the density of the perforations 31 decreases to under the critical threshold of about 200 PSI.

For a deep fryer designed to process potatoes in the range 1 kg to 1.2 kg, the graph of FIG. 3 thus clearly shows the limit values corresponding to the optimum of the design parameters to be implemented in a catalytic converter in order to obtain a significant effect on a cooking appliance.

For a deep fryer designed to process potatoes in the range 1 kg to 1.2 kg, the graph of FIG. 4 shows that, for a catalytic converter having a constant surface area for the intermediate layer 32 of about 1050 m$^2$, the catalytic converter C1 (25 mg of platinum added) has a frying odor treatment capacity that is effective, and in any event higher than the frying odor treatment capacity of the catalytic converter C2 (platinum in the range 50 mg to 70 mg) for the same ratio and the same amount of cerine. The catalytic converter C3 (25 mg of platinum, but with a relative reduction in the proportion of cerine) has non-significant results, precisely because of the reduction in the amount of cerine, which, below the threshold of 4 g (for 1050 m$^2$ in the example described) makes the catalytic converter ineffective.

For the catalytic converters C1 and C2, the surprising results obtained which show that, above 25 mg of platinum and with the amount of cerine remaining the same, increasing the amount of platinum, decreases the effectiveness of the catalytic converter, which can be explained by a sort of camouflaging effect whereby the platinum in the intermediate layer 32 is camouflaged, which does not correspond to the chemical reactions having good efficiency. The larger the amount of platinum added, the higher the camouflaging effect seems to be, good effectiveness being obtained for smaller amounts (25 mg) of platinum.

The disclosure also relates to a method of treating cooking fumes during a cooking cycle in a closed atmosphere, without oxygen being admitted from the outside.

SUSCEPTIBILITY OF INDUSTRIAL APPLICATION

An industrial application of the disclosure lies in manufacturing and designing catalytic converters for domestic cooking appliances and in particular deep fryers.

The invention claimed is:

1. A catalytic converter designed to be integrated into a food-cooking appliance, the food-cooking appliance comprising a deep fryer, and to act, during a cooking cycle in a closed atmosphere and without oxygen being admitted from the outside, to treat the odors in the cooking fumes before the fumes are discharged to the outside, said converter comprising a basic substrate (30) provided with perforations (31) for passing the cooking fumes to be treated, said substrate (30) being coated with an intermediate layer (32) having a large surface area, said intermediate layer (32) provided with a surface component (33) formed of an inorganic solution based on precious metals so as to form the catalytic active layer of said converter, said intermediate layer (32) comprising alumina and cerine so as to form said intermediate layer (32) with a surface area of not less than 150 square meters per gram (m$^2$/g), the amount of alumina/cerine added to the basic substrate (30) lying in the range 30 g/m$^2$ to 35 g/m$^2$, including 15 g/m$^2$ of cerine to 20 g/m$^2$ of cerine.

2. The converter according to claim 1, wherein the basic substrate (30) has at least a minimum surface area of 0.0034 m$^2$/liter of water vapor treated per minute.

3. The converter according to claim 2, wherein the basic substrate (30) is provided with in the range 190 perforations per square inch (PSI) to 400 PSI (in the range 29.49 perforations per square centimeter (PSC) to 62.09 PSC).

4. The converter according to claim 3, wherein the surface component (33) consists of one of a metal, a mixture of metals, a metal oxide, and a mixture of metal oxides, the metal(s) being chosen from platinum, copper, manganese, and palladium.

5. The converter according to claim 4, wherein the surface component (33) is platinum dispersed in the intermediate layer at a concentration of at least 0.02380 mg/m$^2$ and at the most 0.06666 mg/m$^2$.

6. The converter according to claim 5, wherein the platinum is dispersed at a concentration of about 0.02380 mg/m$^2$.

7. The converter according to claim 1 wherein the basic substrate (30) is a monolithic material having a honeycombed structure consisting of one of alumina and cordierite.

8. An appliance for cooking food in a closed atmosphere, the appliance being equipped with said catalytic converter according to claim 1.

9. The appliance according to claim 8, wherein the appliance further comprises a deep fryer.

* * * * *